(12) United States Patent
Baehrle-Miller et al.

(10) Patent No.: US 10,821,952 B2
(45) Date of Patent: Nov. 3, 2020

(54) BRAKING MECHANISM FOR A MOTOR VEHICLE, AND METHOD FOR CONTROLLING THE BRAKING MECHANISM WHEN DIFFERENT FORCE COMPONENTS ARE COMBINED

(71) Applicant: Robert Bosch GmbH, Stuttgart (DE)

(72) Inventors: Frank Baehrle-Miller, Schoenaich (DE); Dieter Blattert, Kirchheim/Neckar (DE); Hubertus Wienken, Langenbrettach (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/515,376

(22) PCT Filed: Aug. 10, 2015

(86) PCT No.: PCT/EP2015/068356
§ 371 (c)(1),
(2) Date: Mar. 29, 2017

(87) PCT Pub. No.: WO2016/055193
PCT Pub. Date: Apr. 14, 2016

(65) Prior Publication Data
US 2017/0217417 A1 Aug. 3, 2017

(30) Foreign Application Priority Data

Oct. 6, 2014 (DE) .................. 10 2014 220 167
May 4, 2015 (DE) .................. 10 2015 208 165

(51) Int. Cl.
*B60T 13/74* (2006.01)
*B60T 13/66* (2006.01)
(Continued)

(52) U.S. Cl.
CPC .......... *B60T 13/662* (2013.01); *B60T 13/588* (2013.01); *B60T 13/741* (2013.01);
(Continued)

(58) Field of Classification Search
CPC .. B60T 13/588; B60T 13/746; F16D 2121/02; F16D 2121/24
See application file for complete search history.

(56) References Cited

U.S. PATENT DOCUMENTS 8,494,745 B2 * 7/2013 Schneider ............... B60T 7/107
303/3
8,938,347 B2 * 1/2015 Baehrle-Miller ....... B60T 7/107
701/70
(Continued)

FOREIGN PATENT DOCUMENTS

CN 101003273 A 7/2007
CN 101517261 A 8/2009
(Continued)

OTHER PUBLICATIONS

Machine translation of DE10345485, retrieved Feb. 4, 2018.*
(Continued)

*Primary Examiner* — Bradley T King
(74) *Attorney, Agent, or Firm* — Maginot, Moore & Beck LLP

(57) ABSTRACT

A method for performing a parking brake application process in a motor vehicle with a service brake and a parking brake includes combining a hydraulic force component and a mechanical force component to obtain a total clamping force for the parking brake application process. The two force components are combined in each parking brake application process.

11 Claims, 3 Drawing Sheets

(51) Int. Cl.
*B60T 13/58* (2006.01)
*F16D 55/226* (2006.01)
*F16D 55/225* (2006.01)
*F16D 121/04* (2012.01)
*F16D 121/24* (2012.01)
*F16D 125/40* (2012.01)
*F16D 121/14* (2012.01)
*F16D 123/00* (2012.01)

(52) U.S. Cl.
CPC ......... *F16D 55/225* (2013.01); *F16D 55/226* (2013.01); *F16D 2121/04* (2013.01); *F16D 2121/14* (2013.01); *F16D 2121/24* (2013.01); *F16D 2123/00* (2013.01); *F16D 2125/40* (2013.01)

(56) References Cited

U.S. PATENT DOCUMENTS

2006/0186731 A1* 8/2006 Bach .................. B60T 7/104
 303/89
2006/0267402 A1* 11/2006 Leiter ................. B60T 7/107
 303/20
2012/0205202 A1* 8/2012 Baehrle-Miller ..... B60T 13/588
 188/106 P
2013/0001027 A1 1/2013 Baehrle-Miller et al.
2013/0175124 A1 7/2013 Tomczak et al.

FOREIGN PATENT DOCUMENTS

| DE | 198 53 721 A1 | 6/1999 |
| DE | 103 45 485 A1 | 4/2005 |
| DE | 10 2009 028 505 A1 | 2/2011 |
| DE | 10 2009 047 127 A1 | 5/2011 |
| DE | 10 2010 002 825 A1 | 9/2011 |
| DE | 10 2011 004 786 A1 | 8/2012 |
| JP | S54-6242 A | 1/1979 |
| JP | 2007-519568 A | 7/2007 |
| JP | 2013-501668 A | 1/2013 |

OTHER PUBLICATIONS

International Search Report corresponding to PCT Application No. PCT/EP2015/068356, dated Nov. 10, 2015 (German and English language document) (5 pages).

* cited by examiner

BRAKING MECHANISM FOR A MOTOR VEHICLE, AND METHOD FOR CONTROLLING THE BRAKING MECHANISM WHEN DIFFERENT FORCE COMPONENTS ARE COMBINED

This application is a 35 U.S.C. § 371 National Stage Application of PCT/EP2015/068356, filed on Aug. 10, 2015, which claims the benefit of priority to Serial No. DE 10 2014 220 167.5, filed on Oct. 6, 2014 in Germany and Serial No. DE 10 2015 208 165.6, filed on May 4, 2015 in Germany, the disclosures of which are incorporated herein by reference in their entirety.

Background

The present disclosure concerns a braking mechanism for a motor vehicle and a method for controlling the braking mechanism by means of a combination of different force components.

Known automated parking brake systems, so-called APBs (automated parking brakes), are designed so that as a rule they can fully provide the necessary holding force by means of a parking brake actuator, for example by means of an electromechanical actuator. Only for a few exceptions, if for example the parking brake actuator is very warm and/or the voltage is low, it can occur that for example hydraulic boosting of the electromechanical actuator, (also referred to as the electromechanical final control element) is necessary. Known parking brake systems can only provide the necessary holding force because they are designed for a suitable actuation load profile by means of a single parking brake actuator. Moreover, the electrical path for the parking brake must also be able to provide suitable power.

From the prior art, DE102010002824A1 is known for example. It is described therein that with a method for adjusting the clamping force exerted by a parking brake, which is applied by an electromotive braking mechanism and if necessary by an auxiliary braking mechanism, during an operating phase of the electromotive braking mechanism the motor resistance and the motor constant are determined from the current motor voltage, the current motor current and the current motor revolution rate and the clamping force achievable by means of the electromotive braking mechanism is determined therefrom, wherein for the case in which the electromotive clamping force does not reach a required target clamping force, an auxiliary brake force is produced by means of the auxiliary braking mechanism.

Furthermore, DE102011004786A1 is known from the prior art for example. It is described therein that with a method for adjusting the clamping force exerted by a parking brake, for the case in which an event that disrupts holding the vehicle occurs after finishing a clamping process, a re-clamping process is carried out by operating an electrical brake motor and an auxiliary braking mechanism.

The object of the disclosure is to reduce the required application time of the parking brake effect when activating the parking brake and in doing so to optimize the design of the components of the parking brake.

SUMMARY

This object is achieved by the features of the disclosure. Developments of the disclosure are specified in the dependent claims.

For this purpose, a method is provided for carrying out a parking brake process in a motor vehicle with a service brake and a parking brake, wherein a hydraulic force component and a mechanical force component are combined to achieve a total clamping force for the parking brake process. According to the disclosure, it is provided that the combination of the two force components is carried out for every parking brake process.

A parking brake process means any process that holds a vehicle stationary. In particular, this means a parking process of a vehicle in which the driver leaves the vehicle.

Furthermore, a parking brake process can relate to processes that enable brief stops of a vehicle, for example during a holding process on a hill.

Of course, superposition is already carried out according to the disclosure in the case of an initial parking brake process without a subsequent re-clamping process. Furthermore, it is not necessary that further conditions are met from which it can be determined for example that a single force component is insufficient, and therefore a further force component is necessary. The combination of the force components is achieved by the superimposed operation of the service brake and the parking brake. The two brakes are operated in the superposition mode according to the disclosure during each parking brake process. This means that both brakes work together in such a way that the force components that they produce complement each other. The force components act on the brake piston and thereby on the brake linings, which produce a clamping force between the brake linings and the brake disk. The resulting total clamping force can therefore be understood to be the sum of the two force components.

In particular, the application time with regard to the parking brake effect is reduced by the method according to the disclosure. This means that the parking brake effect can be provided within a shorter time than with the activation of only one brake system. Furthermore, because of the permanent i.e. present for every parking brake process, combination of the two brake systems, the two brake systems, in particular the parking brake system, can be designed to be suitably optimized. This also reduces the dimensions and the required installation volume, for example. Smaller dimensions have a positive influence on the weight of the system. Furthermore, the costs of the parking brake system can also be reduced by an optimized design.

In an advantageous development, the method is characterized in that an electromechanical force component is produced by means of an automated parking brake and an electrohydraulic force component by means of the hydraulic service brake, wherein the generation and the combination of the two force components is carried out for every parking brake process.

It is to be understood below that the necessary or required total clamping force is produced by a cooperation of the hydraulic service brake and the automated parking brake during a regular parking brake process in all applications. The hydraulic service brake and the automated parking brake are operated for this in the already described superposition mode. The forces produced are in this case considered to be force components of a total force and are used to produce the desired total clamping force.

An electrohydraulic force component means in particular a force component that is produced by electrified components of the service brake. An electromechanical force component means in particular a force component that is produced by an electrical actuator (in particular an electric motor) of the automated parking brake. A combination of the force components is therefore to be understood as operation of the service brake system also being carried out in addition to operation of the parking brake system for the generation of the holding force. The parking brake system according to the disclosure uses the force component produced thereby to build up a holding force as required.

Increasingly, parts of the service brake system are electrified. This also includes, for example, the brake force booster (iBooster) or systems with electrified brake force boosters and electrical pressure control systems (1Box). This is a component that is installed in the vehicle instead of the brake force booster. It has the property that it can both boost the brake force (as with the brake force booster known from the prior art), and can also provide a brake force without the driver having to operate the brake pedal. The iBooster thereby undertakes the complete build-up of brake force by electromechanically displacing the brake cylinder accordingly. By means of the components of the electrified service brake, a brake pressure is provided directly within the vehicle brakes. For example, the iBooster of an electrified brake system can now be permanently integrated into providing the parking brake function. Of course, the electrohydraulic pressure build-up, i.e. the generation of the electrohydraulic force component, can also be carried out by means of a normal actuator of an ESP system (Electronic Stability program), i.e. by means of an ESP pump.

The method of combining the electromechanical force component and the electrohydraulic force component in every parking brake process not only results, as already described, in a reduction of the application time in regard to the parking brake effect. Compared to existing parking brake systems, optimization of the design of the components (motor, gearbox) of the parking brake (smaller, lighter and thereby also less expensive) can also be carried out. This in turn produces a reduction of the unsprung masses on the vehicle wheel. Likewise, the concept provides a reduction of the limitations in relation to the spatial arrangement of the electromechanical actuator on the brake caliper. This enables more clearance in the design of the axle suspension and of the spring-damper system to be obtained. Furthermore, optimization of the supply lines to the parking brake is enabled by the optimization of the design of the components. Because a parking brake according to the disclosure has to provide less output torque, the supply lines can also be implemented more favorably for example. The necessary power transmission by means of the cables is reduced in comparison to known systems. The result of this is for example a reduction of the wire diameter between the control unit and the APB actuators. Likewise, simpler cable installation is enabled, or a freer choice regarding the cable management/cable suspension. A further advantage is gained as a simplification of the final stage in the control unit, because the electrical power that has to be switched across the H-bridge is reduced. This enables smaller electronic components to be used, for example.

Advantageously, the method is characterized in that the parking brake process contains at least one force build-up phase, wherein the combination of the force components is essentially carried out during the entire force build-up phase.

This means that the parking brake process can contain a plurality of phases. The force build-up phase is considered to be the phase in which the required clamping force is built up. Advantageously, it is provided that both actuators of the brake systems provide a force component during the entire phase. By the combination of a plurality of force components, the force to be produced can be advantageously divided between the two components. Superpositioning during the entire force build-up phase means in this case that the superpositioning is carried out during the entire time period of the force build-up in the superposition mode. This enables a very rapid build-up of the total clamping force to be achieved. Furthermore, determination of the achievement of the necessary clamping force can be assisted by continuous superpositioning.

In an advantageous design, the method is characterized in that when the parking brake process is activated the electrohydraulic force component is produced in a first step.

In this case, generation means the actual generation of a force component, for example by means of a pressure built up by the electrified components of the hydraulic service brake system. Activation of the parking brake process can be carried out once a parking brake request is detected. A parking brake request can for example be carried out by the driver by means of the manual operation of a button. Likewise, automated requests for the holding force are prior art, for example when holding on a hill. Of course, during (or after) such an activation of the parking brake process, activation of the brake actuators can be carried out. Here the actuator is provided to actuate the service brake to produce the electrohydraulic force component. Said actuator has highly dynamic behavior in the pressure build-up and as a result can provide a first force component in a short time. Said force component can already provide a first clamping force for the parking brake process after a short time. This is also true at low temperatures, in particular if no hydraulic fluid has to be sucked in for producing pressure (as for example with ESP), but instead for example the brake cylinder is displaced by means of an iBooster and thereby a fluid volume is directly displaced.

In one advantageous development, the method is characterized in that a defined hydraulic pressure is produced during the parking brake process.

A defined hydraulic pressure means a fixed pressure value here. This has a magnitude of 40 bar for example. The level of the pressure value correlates with an arising hydraulic force component. The determination of the pressure value is dependent on the design of the brake system as well as a definition of the parking brake process. Furthermore, it can advantageously be provided that the same pressure value is selected for all parking brake situations, i.e. the pressure value is independent of the vehicle state or the ambient conditions, in order to keep the control costs low. In an alternative implementation, it is provided that the level of the pressure value is to be adjusted depending on the vehicle state or the ambient conditions, in order to possibly enable the maximum pressure boost in specific situations, whereas in other situations a smaller pressure boost is provided, in order for example to reduce the component load. The defined hydraulic pressure can for example be produced by means of electrified components of the hydraulic service brake system. Advantageously, the hydraulic pressure produced is furthermore independent of possible brake pedal operation. This means that a pressure level produced by means of brake pedal operation is suitably taken into account and the pressure produced by means of the electrified components is adjusted accordingly, so that the resulting hydraulic force component reaches the specified value.

In a further advantageous design, the method is characterized in that the electromechanical force component is produced in a second step, wherein in particular the second step is carried out after or simultaneously with the first step.

This makes it clear that the force components do not have to be produced at the same time. In particular, this should be understood to mean that the electromechanical force component is produced no earlier than at the same time as the hydraulic force component. Because of the different dynamic behavior, both systems have different activation times until the build-up, i.e. the actual generation, of a brake force. In this case, as a rule the hydraulic service brake has more dynamic behavior than the electromechanical parking brake. Because of the dynamic behavior of the systems, for example with simultaneous activation of the actuators of both systems it is assumed that the generation of the electrohydraulic force component is carried out before the generation of the electromechanical force component. Because the electrohydraulic force component is available at an earlier point in time in this case, a first clamping force is already produced, although it reduced compared to the required total clamping force and is not sufficient for the parking brake process. In this case, it is provided within the context of the procedure to use said effect and advantageously to build up a first force component for a clamping force, even though the required second force component can ideally be produced simultaneously, but probably only at a later point in time. Moreover, generation of the force component that is offset in time can enable a stepped force build-up. This can enable the component load to be reduced.

In an advantageous alternative design of the method, it is provided that during activation of the parking brake process, the hydraulic service brake is activated in a first step and the automated service brake is activated in a second step, wherein in particular the second step is carried out after or simultaneously with the first step.

This means that the activation of the service brake is carried out before the point in time of activation of the parking brake. In order to reduce the application time of the parking brake effect, it is provided to first start the application of the holding force by means of hydraulic means and then to combine the hydraulic component with the electromechanical component. Furthermore, by activating the parking brake with a time offset after the activation of the service brake, a stepped force build-up can be supported. This enables the component load to be reduced further.

In an advantageous development, the method is characterized in that an increase of the electromechanical force component is carried out until a total clamping force is reached.

This means that the hydraulic force component is produced in a first step and is held constant from then on. Said force component is combined with an electromechanical force component in a second step, for example during a so-called force build-up. Said electromechanical force component is variable and is increased during the force build-up phase. The force component is increased until a defined or required total clamping force is reached. This means that the second step is carried out until the electromechanical force component has reduced a difference between a defined total clamping force and the adjusted hydraulic force component. Because one force (electrohydraulic force component) is held constant during the force build-up phase, whereas only a further force (electromechanical force component) is varied, the control technology cost can advantageously be kept low, because only one variable is to be tracked.

In an advantageous development, it is provided that the actuation of means for achieving the electrohydraulic force component is removed after reaching the total clamping force.

This means that after reaching the necessary total clamping force by means of a combination of the two brake systems, the means to achieve the electrohydraulic force component are removed. This includes for example the actuation of the actuator, of the iBooster, and also of hydraulic valves.

Depending on the present driving situation, the means can also be directly prepared for an upcoming task according to the present driving situation. The removal can be carried out once reaching the total clamping force has been detected. This enables a further increase in force to be prevented.

In an advantageous development, it is provided that after reaching the total clamping force the actuation of means to achieve the electromechanical clamping force as well as the actuation of means to achieve the electrohydraulic force component are removed essentially simultaneously.

This means that the removal of the actuation, for example of the actuators, is carried out at the same point in time. This enables overloading of an individual actuator after the removal of a force component to be prevented.

Furthermore, according to the disclosure a control unit for carrying out a parking brake process in a motor vehicle with a service brake and a parking brake is provided, which is designed and has the means to carry out a method as claimed in any one of the aforementioned claims.

This means that the control unit is designed, which means configured, and comprises the means to carry out the described method.

Furthermore, according to the disclosure, an automated parking brake for a motor vehicle with a hydraulic service brake is provided, wherein the parking brake is designed and comprises the means to carry out a method as claimed in any one of the aforementioned claims. In an advantageous design, it is provided that the parking brake is implemented as a "motor on caliper" concept.

In this case, the design of the parking brake is deliberately carried out in such a way that, regarding the clamping force thereof that can be provided, the electromechanical component represents between 40 and 60% of the total clamping force of known electromechanical systems. That is, known systems are as a rule designed so that they can provide the clamping force (rough force value approx. 18 kN) under nominal conditions (12V, room temperature), which is sufficient for parking the vehicle on up to a 30% gradient. Lower clamping forces (approximate force value approx. 8.5 kN to 10 kN) are usually sufficient with known parking brake systems for gradients of up to 20% (legal requirement). Owing to the reduction of the necessary electromechanical clamping force that is to be provided, the electromechanical part and also the electrical part of the parking brake system can be implemented smaller, lighter and thereby also less expensively. An advantageous design of the parking brake therefore provides a design for a force of about 8.5 kN to 10 kN. By such a design, systems can be defined that already represent a significant cost reduction compared to known systems. The locking itself (holding the locking force) is unchanged, because the brake piston continues to be supported by the nut and spindle system. In order to adequately take into account both possible tolerances of the force provision (including the variance of the coefficients of friction of the brake linings) and also (thermal) settling effects, clamping is approx. 3 kN to 4 kN stronger than would be necessary by computation or physically. Because the electromechanical actuator, as described above, is insufficient owing to the design to provide the clamping force of for example 13 kN by itself, for every actuation (build-up of parking brake force) the electromechanical actuator is hydraulically assisted. That is, the provision of the clamping force is generally carried out in the sense of a superposition of electromechanical and electrohydraulic clamping forces.

In an alternative advantageous design of the parking brake, it is provided that the electromechanical component constitutes between 20 and 40% of the clamping force that can be provided. The rest of the clamping force is in particular provided by the existing hydraulic actuator in the vehicle. Using such a design, systems can be defined that only provide minimal dimensioning of the electromechanical actuator. This enables a further cost reduction—when using the already existing hydraulic pressure supply. The electromechanical actuator is hereby designed to decelerate the vehicle according to legal requirements. However, the deceleration is carried out as a rule by means of a hydraulic pressure supply. Only in the case of an unavailable or insufficiently available pressure supply can the electromechanical actuator undertake the pressure supply.

BRIEF DESCRIPTION OF THE DRAWINGS

Further features and functionality of the disclosure are revealed by the description of exemplary embodiments using the accompanying figures.

DETAILED DESCRIPTION

Figure 1:
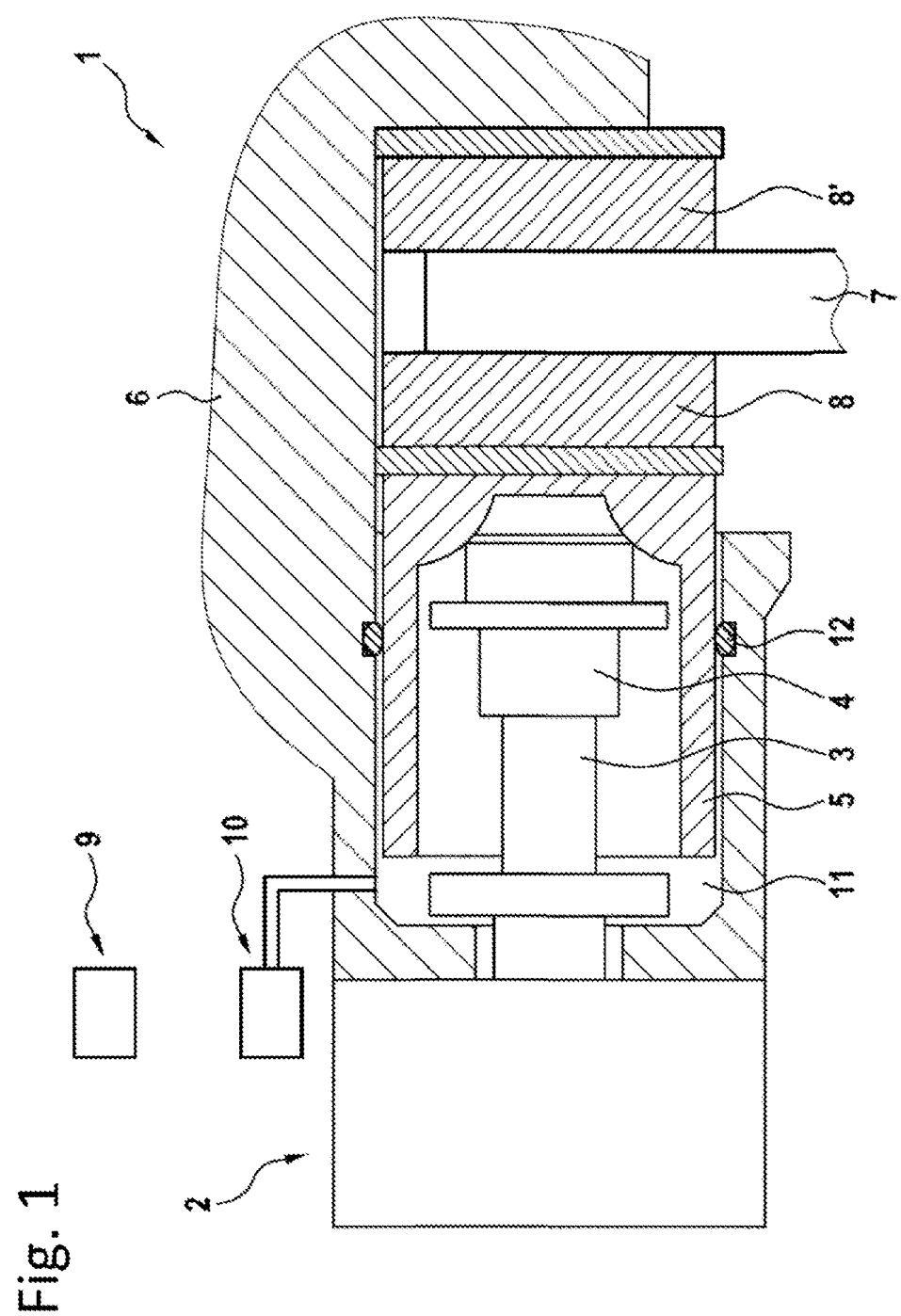
FIG. 1 shows as prior art a schematic sectional view of a braking mechanism with an automatic parking brake of a "motor on caliper" design.

FIG. 1 shows a schematic sectional view of a braking mechanism 1 for a vehicle according to the prior art. The braking mechanism 1 comprises in this case an automated (automatic) parking brake that can exert a clamping force for holding the vehicle stationary by means of an actuator 2 (brake motor). For this purpose, the actuator 2 of the parking brake drives a spindle 3 supported in an axial direction, in particular a threaded spindle 3. On the end thereof facing towards the actuator 2, the spindle 3 is provided with a spindle nut 4 that rests against the brake piston 5 in the clamped state of the automated parking brake. In this way, the parking brake transfers a force to the brake linings 8, 8' or the brake disk 7 electromechanically. In this case, the spindle nut rests against an inner end face of the brake piston 5 (also known as the rear of the brake piston base or the inner piston base). The spindle nut 4 is displaced axially during a rotary displacement of the actuator 2 and a resulting rotary displacement of the spindle 3. The spindle nut 4 and the brake piston 5 are supported in a brake caliper 6 that engages around a brake disk 7 in a pincer-like manner.

A respective brake lining 8, 8' is disposed on each side of the brake disk 7. In the case of a clamping process of the braking mechanism 1 by means of the automated parking brake, the electric motor (actuator 2) rotates, whereupon the spindle nut 4 as well as the brake piston 5 are moved in the axial direction towards the brake disk 7 in order thereby to produce a predetermined clamping force between the brake linings 8, 8' and the brake disk 7. Because of the spindle drive and the self-locking means connected thereto, a force produced with the parking brake by actuating the electric motor is also maintained when the actuation is ended.

The automated parking brake is for example designed as shown as a "motor on caliper" system and is combined with the service brake. This could also be considered as being integrated within the system of the service brake. Both the automated parking brake and also the service brake engage the same brake piston 5 as well as the same brake caliper 6 in this case, in order to build up a brake force on the brake disk 7. However, the service brake comprises a separate actuator 10. The service brake is designed as a hydraulic system in FIG. 1, wherein the actuator 10 can be represented by the ESP pump or a so-called iBooster. During service braking, a predetermined clamping force is built up hydraulically between the brake linings 8, 8' and the brake disk 7. To build up a brake force by means of the hydraulic service brake, a medium 11, in particular an essentially incompressible brake fluid 11, is compressed in a fluid chamber bounded by the brake piston 5 and the brake caliper 6. The brake piston 5 is sealed against the surroundings by means of a piston sealing ring 12.

The actuation of the brake actuators 2 and 10 is carried out by means of a final stage, i.e. by means of a control unit 9, which can be for example a control unit of a driving dynamics system, such as an ESP (electronic stability program) or another control unit.

In the case of the actuation of the automated parking brake, first the free travel or the air gap must be overcome before a brake force can be built up. For example, the distance that the spindle nut 4 must overcome by the rotation of the spindle 3 in order to come into contact with the brake piston 5 is referred to as free travel. The distance between the brake linings 8, 8' and the brake disk 7 in disk brake systems of motor vehicles is referred to as an air gap. As a rule, said process lasts a relatively long time in relation to the overall actuation, in particular for the automated parking brake. At the end of such a preparation phase, the brake linings 8, 8' are in contact with the brake disk 7 and the force build-up starts upon further actuation. When applying the brake linings 8, 8', it is therefore important within the scope of this disclosure not to impose a brake force, or to set the brake force that is imposed during application as low as possible in order not to produce any undesired premature braking effects. FIG. 1 shows the state with the free travel and air gap already overcome. Here the brake linings 8, 8' are in contact with the brake disk 7 and all brakes, i.e. the parking brake and also the service brake, can immediately build up a brake force on the corresponding wheel in the event of subsequent actuation. The descriptions of the free travel or the air gap also apply analogously to the service brake, wherein however overcoming the free travel represents less time than with the parking brake because of the highly dynamic pressure build-up.

Figure 2:
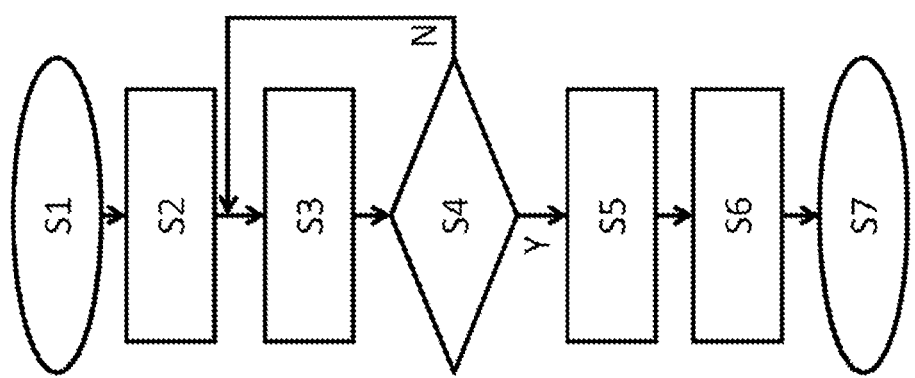
FIG. 2 shows a flowchart of the process according to the disclosure.

FIG. 2 shows a flow chart of a possible embodiment of the process according to the disclosure. S1 refers to the starting point of the method. The process is for example started if a parking brake request, for example a parking situation, is detected. After detecting the parking situation, a pressure supply by means of the hydraulic service brake is activated in step S2. With the pressure supply, a defined hydraulic pressure is produced and is controlled in the brake system. The magnitude of said pressure is for example 40 bar. Because of the provided hydraulic pressure, the vehicle can be held at first hydraulically, even if only with a smaller force. The supply of pressure can be carried out by means of electrified components of the hydraulic service brake system, for example by means of an electrified pressure booster, of a so-called iBooster. In the case of the use of such components, the pressure supply can be carried out relatively rapidly, because no liquid has to be sucked in (such as for example with a classic ESP pump). The pressure supply is carried out by means of an iBooster alone by displacement of the fluid volume. In a next step S3, the electromechanical actuator is actuated. This must first overcome the existing air gap in a known manner. Once the spindle nut contacts the base of the spindle, however, a steep increase in force is carried out, because the brake system is already preloaded. From this point in time, the electrohydraulic force and the electromechanical force work together. By the combination of the two force components, a total force results that produces a clamping force in the brake system. The force produced, or the total clamping force, is checked in a further step S4 as to whether it corresponds to a defined, required force. If this is not the case (N), the force component produced by means of the electromechanical actuator is increased. If it is detected that the required force is reached (Y), the electromechanical actuator is turned off in a next step S5. Likewise, turning off the electrohydraulic actuator is carried out in a step S6. Hereby the two steps S5 and S6 are also carried out at the same time, which means switching the actuators off can be carried out at the same time. The final step 7 indicates the end of the method.

Figure 3:
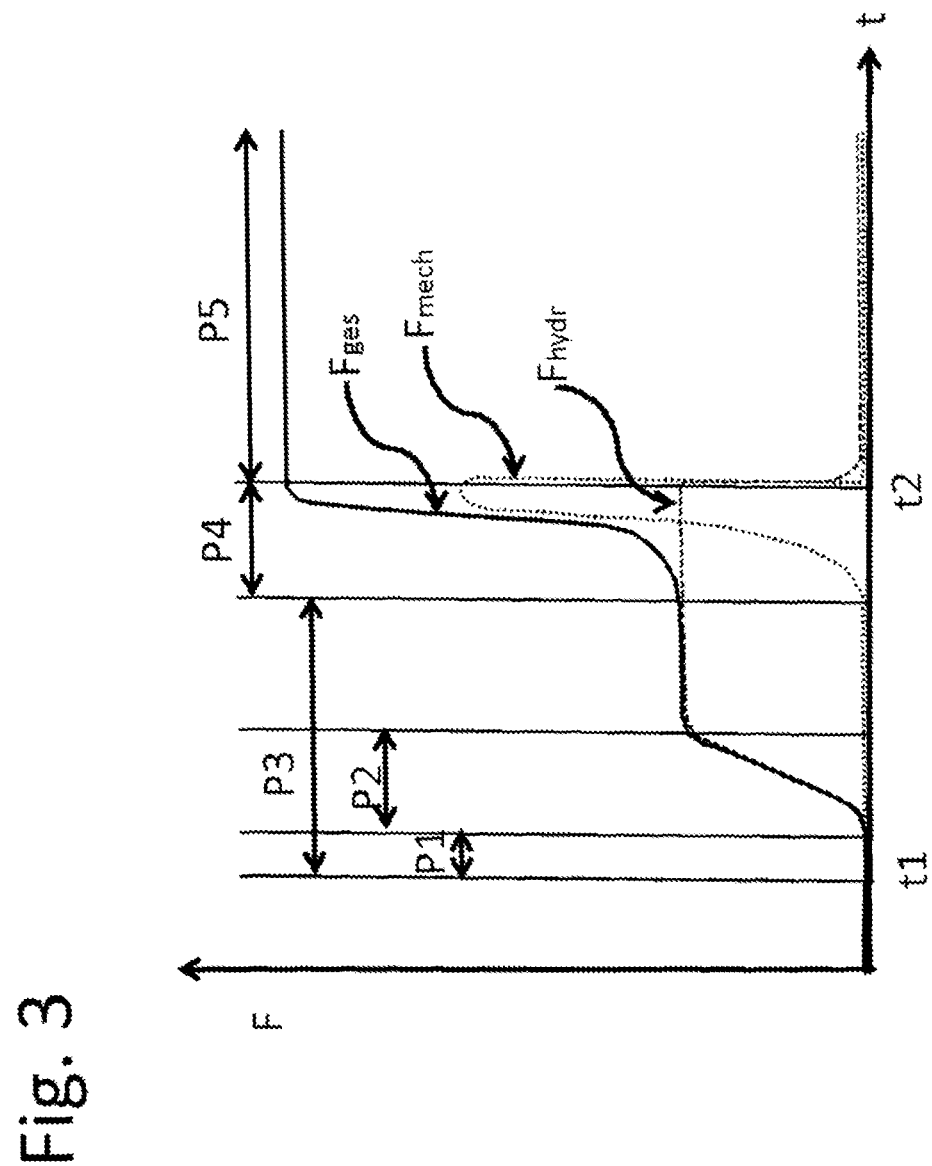
FIG. 3 shows a schematic representation of the force profile during and after the clamping phase of a parking brake process according to the disclosure.

FIG. 3 shows a schematic representation of the force profile F during and after a clamping process according to the disclosure. Whereas FIG. 2 provides a procedural representation of the process, FIG. 3 illustrates the same method by means of a time perspective t. The method starts at the point in time t1. The build-up of a defined hydraulic pressure value is carried out first. For this purpose, an actuator of the service brake system is actuated. This is for example the iBooster. In the phase P1, the free travel and the air gap of the service brake are overcome. In a phase P2, the generation of the electrohydraulic force component $F_{hydr}$ is carried out. For this purpose, a defined pressure value is produced. Once the pressure value has been produced, this now only has to be maintained during the further course of the process. In the present example, the actuator of the parking brake system is also actuated simultaneously with the actuation of the actuator of the service brake system. Overcoming the free travel of the parking brake is carried out in the phase P3. After overcoming the free travel of the parking brake, i.e. if the spindle nut is in contact with brake piston, a steep increase in force is carried out with a further deflection of the spindle nut, because the brake system is already preloaded by means of the hydraulic service brake. In said phase P4, the actual superposition of the parking brake and the service brake is carried out. The electromechanical force component $F_{mech}$ is produced by the actuation of the parking brake. This is superimposed on the existing electrohydraulic force component $F_{hydr}$ and increases the achieved total clamping force $F_{ges}$. The actuation of the actuator of the parking brake is carried out until the required total clamping force $F_{ges}$ is reached. An increase of the fluid volume between the brake caliper and the brake piston results from the actuation of the parking brake by the displacement of the brake piston. Because of said increase in the fluid volume, the hydraulic pressure may have to be adjusted by means of the service brake. This can be carried out in a targeted manner by means of an iBooster system that is equipped with a suitable force sensing system and means for pressure monitoring. On reaching the required total clamping force $F_{ges}$, removal of the actuation is carried out, which means that turning off the electromechanical and electrohydraulic actuators is carried out at the point in time t2. This prevents a further build-up of force. Removal of the electromechanical force component $F_{mech}$ as well as the electrohydraulic force component $F_{hydr}$ is carried out by turning off the actuators.

The total clamping force $F_{ges}$ that is built up is, however, also maintained after the end of the clamping process, because the exemplary parking brake as described is provided with a self-locking means, as is represented in phase P5. Only active actuation of the parking brake in the reverse direction causes releasing of the parking brake, which is not shown in FIG. 3 however.

The invention claimed is:

1. A method for carrying out a parking brake process with a motor vehicle that includes a service brake and a parking brake, the method comprising:
   operating the service brake and the parking brake in a superposition mode,
   wherein, in the superposition mode, a hydraulic force component and a mechanical force component are combined to achieve a total clamping force for the parking brake process,
   wherein the superposition of the hydraulic force component and the mechanical force component to achieve the total clamping force in the superposition mode is carried out for every parking brake process,
   wherein the mechanical force component is generated by an electric motor,
   wherein the electric motor is configured to generate a maximum mechanical force that is less than the total clamping force, and
   wherein the service brake generates a defined hydraulic pressure to produce the hydraulic force component, and the defined hydraulic pressure is the same for every parking brake process.

2. The method as claimed in claim 1, wherein the mechanical force component comprises an electromechanical force component and the hydraulic force component comprises an electrohydraulic force component,
   wherein the electromechanical force component is generated by an automated parking brake and the electrohydraulic force component is generated by the hydraulic service brake, and
   wherein the generation and the superposition of the electromechanical force component and the electrohydraulic force component is carried out for every parking brake process.

3. The method as claimed in claim 1, wherein the parking brake process includes at least one force build-up phase, and wherein the superposition of the force components is essentially carried out during the entire force build-up phase.

4. The method as claimed in claim 2, wherein on the activation of the parking brake process, the electrohydraulic force component is generated in a first step.

5. The method as claimed in claim 4, wherein the electromechanical force component is generated in a second step, the second step carried out after or simultaneously with the first step.

6. The method as claimed in claim 2, wherein on activation of the parking brake process, the hydraulic service brake is activated in a first step and the automated parking brake is activated in a second step, the second step carried out after or simultaneously with the first step.

7. The method as claimed in claim 2, wherein an increase in the electromechanical force component is carried out until the total clamping force is reached.

8. The method as claimed in claim 7, wherein the actuation to achieve the electrohydraulic force component is removed after reaching the total clamping force.

9. The method as claimed in claim 7, wherein after reaching the total clamping force, the actuation to achieve the electromechanical force component as well as the actuation to achieve the electrohydraulic force component are removed essentially simultaneously.

10. A control unit for carrying out a parking brake process in a motor vehicle that includes a service brake and a parking brake, the control unit comprising:
- a device configured to carry out a method for carrying out the parking brake process, the method including:
  - operating the service brake and the parking brake in a superposition mode,
  - wherein, in the superposition mode, a hydraulic force component and a mechanical force component are combined to achieve a total clamping force for the parking brake process,
  - wherein the superposition of the hydraulic force component and the mechanical force component to achieve the total clamping force in the superposition mode is carried out for every parking brake process,
  - wherein the mechanical force component is generated by an electric motor,
  - wherein the electric motor is configured to generate a maximum mechanical force that is less than the total clamping force, and
  - wherein the service brake generates a defined hydraulic pressure to produce the hydraulic force component, and the defined hydraulic pressure is the same for every parking brake process.

11. An automated parking brake for a motor vehicle with a hydraulic service brake, the parking brake comprising:
- a device configured to carry out a method for carrying out a parking brake process, the method comprising:
  - operating the service brake and the parking brake in a superposition mode,
  - wherein, in the superposition mode, a hydraulic force component and a mechanical force component are combined to achieve a total clamping force for the parking brake process,
  - wherein the superposition of the hydraulic force component and the mechanical force component to achieve the total clamping force in the superposition mode is carried out for every parking brake process,
  - wherein the mechanical force component is generated by an electric motor,
  - wherein the electric motor is configured to generate a maximum mechanical force that is less than the total clamping force, and
  - wherein the service brake generates a defined hydraulic pressure to produce the hydraulic force component, and the defined hydraulic pressure is the same for every parking brake process.

* * * * *